July 14, 1931. F. W. WADE 1,814,649
COMBINED LAWN AND HEDGE TRIMMER
Filed Dec. 28, 1929
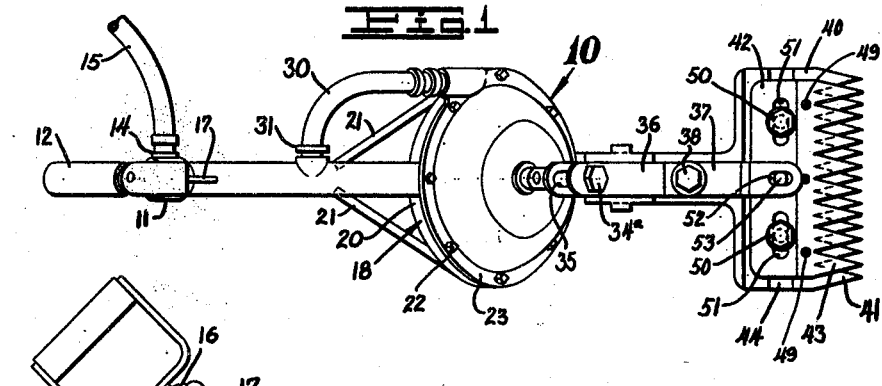
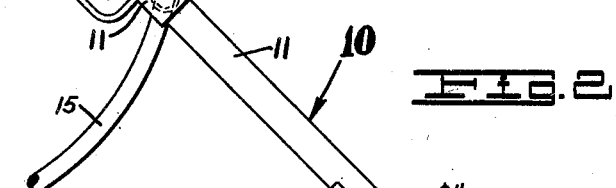
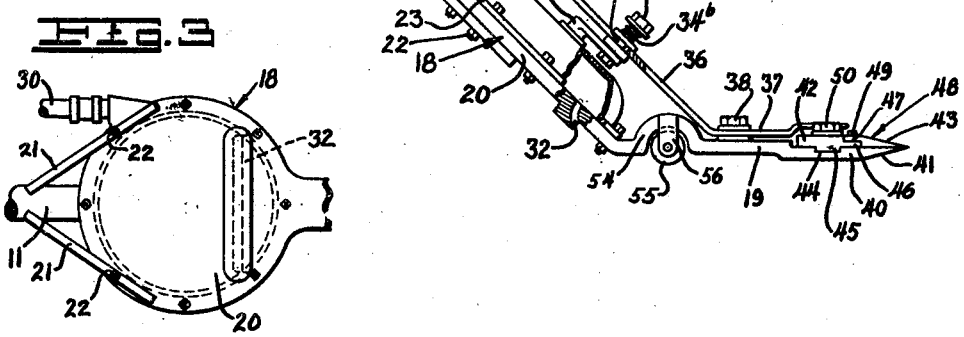
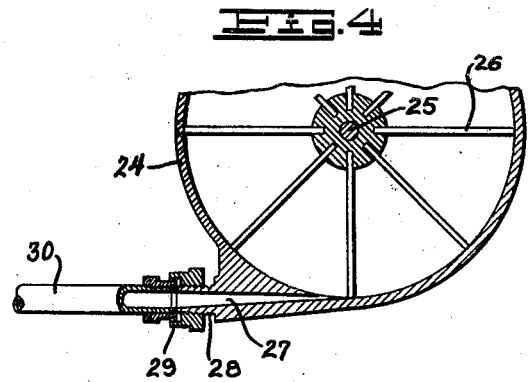
INVENTOR.
FRANCIS W. WADE.
BY
ATTORNEY.

Patented July 14, 1931

1,814,649

UNITED STATES PATENT OFFICE

FRANCIS W. WADE, OF CANON CITY, COLORADO

COMBINED LAWN AND HEDGE TRIMMER

Application filed December 28, 1929. Serial No. 417,176.

This invention relates to cutting machines.

The general object of the invention is to provide a cutting machine which is particularly adapted for use as a lawn or hedge trimmer.

Another object of this invention is to provide an improved trimming device which is actuated by a hydraulic motor.

Another object of the invention is to provide a readily portable lawn or hedge trimmer wherein the motive power is supplied by a water motor which is carried by the trimmer.

A further object of the invention is to provide a hedge trimmer wherein the shears are operated by a water motor and where in a novel means is provided for driving the shears from the water motor.

Other objects of my invention will be apparent from the following description taken in connection with the accompanying drawings wherein:

Fig. 1 is a top plan view showing a trimmer embodying the features of my invention.

Fig. 2 is a side elevation of the trimmer.

Fig. 3 is a fragmentary bottom plan view of the water motor and

Fig. 4 is a fragmentary section showing the supply pipe to the water motor.

Referring to the drawings by reference characters I have shown my device as embodied in a trimmer indicated generally at 10. Although in the following description I have shown my invention as embodied in a lawn and hedge trimmer it will be understood that it can with equal facility be used for other purposes and that I do not wish to be limited to the particular use set forth.

Referring again to the drawings my device includes a hollow handle 11 which serves both as a handle and a conduit for fluid. This handle is connected to a grip 12 which may be secured to a collar 13 arranged on the handle 11. The handle 11 includes a nipple 14 to which a hose 15 may be secured to supply water to the hollow handle 11.

The flow of fluid from the hose 15 to the handle 11 may be controlled by a valve 16 which includes an operating handle 17. The handle 17 being arranged adjacent the grip 12 enables the operator to very easily control the flow of fluid.

In the accompanying drawings the handle is shown as secured to a frame indicated generally at 18. This frame includes a normally horizontal portion 19 and an angularly arranged portion 20 integral with the horizontal portion 19. The angular portion 20 of the frame is connected by braces 21 to the handle 11. One end of each brace 21 may be secured to the handle in any desired manner as by welding. The other end of each brace is engaged by bolts 22. These bolts 22 also serve to hold the flange 23 of the water motor cover 24 in position. The water motor is arranged within the cover 24 and includes a central shaft 25 having vanes 26 extending radially therefrom.

These vanes move in close proximity to the inner surface of the cover 24 and the water is supplied to the water motor through an inlet 27 which has a threaded nipple 28 thereon which is engaged by a coupling 29 with a pipe 30, which pipe 30 is in turn connected by a coupling 31 with the pipe or handle 11.

The water as previously stated is controlled by the valve 16 and when this valve is in open position water passes through the hose 15, the valve 16, the handle 11, pipe 30 and inlet 27 to the motor, thereby actuating the same and causing the shaft 25 to rotate.

The water is discharged from the motor through an outlet 32 which is arranged to cause the water to be discharged throughout the width of the motor and to be discharged forwardly to prevent the water from spraying on the person operating the trimmer.

The shaft 25 has a crank arm 33 thereon which includes a pin 34 which is positioned in a slot 35 in an arm 36 of an operating member, the other arm 37 of which is mounted on a pivot 38 secured to the horizontal portion 19 of the frame.

The pin 34 includes a head 34$^a$ spaced from the arm 36 and surrounding the pin 34 I provide a coiled spring 34$^b$ which is adapted to resiliently urge the arm 36 into engagement with the crank arm 32 but which allows the arm 36 to move away from the crank arm 33 as is essential when the device operates.

The cutting portion or shears includes a lower portion 40 which is rigidly secured to the frame and which includes teeth 41 while the upper portion includes a movable blade 42 having teeth 43 thereon.

The lower blade is grooved as at 44 while the upper blade has a tongue 45 thereon which fits in the groove 44. The upper blade also has a tongue 46 thereon which matches with another tongue 47 on the upper blade, allowing the forward portion 48 of the upper blade to be removed, the two portions of the upper blade being normally held together by screws 49.

The upper blade is retained in engagement with the lower blade by a plurality of bolts 50 secured thereto and which are positioned in slots 51 provided in the upper blade.

The arm 37 is provided with a slot 52 which receives a pin 53 mounted on the upper blade.

In order to facilitate movement of my device I may form the frame 19 as at 54 to provide a recess for a roller 55 which is suspended in a stirrup 56 secured to the frame.

From the foregoing description it will be apparent that when the valve handle 17 is turned to open the valve 16 water will be supplied to the motor thereby causing the shaft 25 to be rotated and causing the arm portion 37 to oscillate thereby moving the upper cutting blade backward and forward and causing a cutting action.

It will thus be apparent that I have provided an improved trimmer which is highly efficient in use and which can be economically manufactured.

What I claim is:

1. In a combined lawn and hedge trimmer, a frame, said frame including a base, a water motor on said base, means to conduct water to said motor to operate the same, a fixed blade mounted on said frame, a movable blade coacting with said fixed blade, an operating member pivoted on said frame, means to connect said operating member with said movable blade and other means to connect said operating member to said motor, there being a forwardly and downwardly directed aperture in said base in communication with the discharge from said water motor whereby the water is discharged forwardly and downwardly.

2. In a combined lawn and hedge trimmer, a frame, a roller carried by said frame, a motor casing mounted on said frame, a motor in said casing, said motor including a shaft, a crank on said shaft, a pin on said crank, an operating member including two arms, one arm having a slot fitting said pin, a fixed toothed cutting blade on said frame, a second toothed cutting blade movable with respect to said first blade, said second arm having a pin and slot connection with said movable blade, a hollow handle connected with said frame, means to afford communication between said hollow handle and said motor casing, means to connect a hose to said handle, a valve for controlling passage through said handle, a grip on said handle, a valve handle for controlling said valve, said frame having a transverse rib on the outer face thereof, an aperture in said rib communicating with said motor, said aperture being arranged to discharge water from said motor forwardly and downwardly.

3. In a combined lawn and hedge trimmer, a frame including a horizontal portion and a portion arranged at an angle to said horizontal portion, a roller carried by said horizontal portion, a motor casing mounted on said angular portion, a motor in said casing, said motor including a shaft, a crank on said shaft, a pin on said crank, an operating member including two arms, one arm being parallel to said angular portion and having a slot fitting said pin, a fixed toothed cutting blade on said frame, a second toothed cutting blade movable with respect to said first blade, said second arm being parallel to said horizontal portion and having a pin and slot connection with said movable blade, a handle connected to said frame, means to supply fluid to said motor casing to operate said motor and a valve for controlling passage through said fluid supply means.

4. In a combined lawn and hedge trimmer, a frame including a horizontal portion and a portion arranged at an angle to said horizontal portion, a roller carried by said horizontal portion, a motor casing mounted on said angular portion, a motor in said casing, said motor including a shaft, a crank on said shaft, a pin on said crank, an operating member including two arms, one arm being parallel to said angular portion and having a slot fitting said pin, a fixed toothed cutting blade on said frame, a second toothed cutting blade movable with respect to said first blade, said second arm being parallel to said horizontal portion and having a pin and slot connection with said movable blade, a hollow handle connected to said frame, means to afford communication between said hollow handle and said motor casing, means to connect a hose to said handle, a valve for controlling passage through said handle, a grip on said handle and a valve handle for controlling said valve, said valve handle being arranged adjacent said grip, said frame having a water outlet thereon.

In testimony whereof, I hereunto affix my signature.

FRANCIS W. WADE.